United States Patent [19]

Kameyama et al.

[11] Patent Number: 5,302,070
[45] Date of Patent: Apr. 12, 1994

[54] BOLT ENGAGING STRUCTURE

[75] Inventors: Yasushi Kameyama; Mitsunari Tashiro, both of Hiroshima, Japan

[73] Assignee: Yazaki Corporation, Japan

[21] Appl. No.: 987,191

[22] Filed: Dec. 8, 1992

[30] Foreign Application Priority Data

Dec. 9, 1991 [JP] Japan .................... 3-101150[U]

[51] Int. Cl.$^5$ ............................................ F16B 37/16
[52] U.S. Cl. ................................. 411/437; 411/508
[58] Field of Search ............... 411/182, 15, 508, 436, 411/437, 512, 433

[56] References Cited

U.S. PATENT DOCUMENTS

| 4,435,111 | 3/1984 | Mizusawa | 411/437 |
| 4,547,108 | 10/1985 | Nakama | 411/508 X |
| 4,728,236 | 3/1988 | Kraus | 411/437 |
| 4,828,444 | 5/1989 | Oshida | 411/437 |
| 4,934,889 | 6/1990 | Kurosaki | 411/512 X |

FOREIGN PATENT DOCUMENTS

| 3403369 | 8/1985 | Fed. Rep. of Germany | 411/437 |
| 1-118216 | 8/1989 | Japan . | |
| 1-163277 | 11/1989 | Japan . | |
| 2-80277 | 6/1990 | Japan . | |

Primary Examiner—Rodney M. Lindsey
Attorney, Agent, or Firm—Wigman, Cohen, Leitner & Myers

[57] ABSTRACT

A structure for engaging a bolt is disclosed. The bolt engaging structure comprises a boss section having a cylindrical wall which defines a hole for receiving the bolt therein and an engaging portion for engaging with the bolt accommodated within the hole. The engaging portion, while slanting inwardly, extends from the cylindrical wall substantially toward a first direction in which the boss section is pulled off of the bolt. Further, the engaging portion has an abutting portion to prevent the engaging portion from being bent in a second direction which is opposite to the first direction while the boss section is forced to be pulled off of the bolt.

6 Claims, 4 Drawing Sheets 5,302,070

BOLT ENGAGING STRUCTURE

TECHNICAL FIELD

The present invention relates generally to a structure for engaging a bolt therewith and more particularly to a structure which engages with a screw portion of a bolt so as not to be pulled off of the bolt easily.

BACKGROUND OF THE INVENTION

A conventional structure for engaging a bolt has been disclosed in the Japanese Utility Model Application Laid Open Number 1-118216. In this description, clips including the bolt engaging structure are used for fixing wire harnesses for vehicles.

FIGS. 1A and 1B are respectively a plan view and a side elevational view of a clip which is similar to the clip mentioned above. As shown in FIGS. 1A and 1B, a boss section 3 extends from a sheet of plate 2 with which a wire harness W is securely bound by a roll of tape T. This boss section 3 has a cylindrical wall which defines a hole 5 for receiving a stud bolt 4 therein as shown in FIGS. 2 and 3. In this hole 5, flexible engaging portions 6 are provided. These engaging portions 6, while slanting inwardly, extend from the cylindrical wall of the boss section 3. Namely, these engaging portions 6 substantially extend in a first direction A in which the boss section 3 may be pulled off of the bolt. Further, the engaging portion 6 includes an engaging click 7 which is positioned in a distal part of the engaging portion 6 so as to engage with the roots of the threads of the bolt 4.

In order to engage the clip 1 with the threads of the bolt 4, the hole 5 of the clip 1 is abutted against a thread portion M of the bolt 4 and then the boss section 3 is pressed relative to the bolt 4 as shown in FIG. 3. The engaging portions 6, while being pressed by the thread portion M of the bolt 4, flexes slightly toward the cylindrical wall of the boss section 3 to allow the bolt 4 to be received inside the boss section 3. After this step, the engaging clicks 7 of the engaging portion 6 become engaged with a root of threads of the bolt 4 to prevent the bolt 4 from being slipped out of the boss section 3.

In this bolt engaging structure described above, if a pulling force F along the first direction A is applied to the clip 1 as shown in FIG. 4, the engaging portions 6 are forced to be bent toward a second direction B which is opposite to the first direction A and in which the clip 1 is pressed to receive the bolt 4. In other words, the engaging portions 6 are forced to be bent toward the second direction B which is opposite to the direction in which the engaging portions 6 substantially extend. Thus, if the pulling force F is applied to the clip 1, it may happen that the engaging portions 6, while being buckled, become disengaged with the root of threads 4a and are pulled off of the bolt 4.

In order to prevent the clip 1 from being pulled off of the bolt 4, it may be thought that the engaging portions 6 should be thickened. However, if the engaging portion 6 is thickened, a stronger force to press the clip 1 relative to the bolt 4 is needed when the clip 6 receives the bolt 4. Accordingly, thickening the engaging portions 6 is undesirable. Thus, up to now, it was difficult to provide a clip with a sufficient force for preventing the clip from being pulled off of the bolt.

The Japanese Utility Model Application Laid Open Number 1-163277 discloses another type of bolt engaging structure. As shown in FIG. 5A, in this bolt engaging structure which is employed in a clip 1', an engaging portion 6' has a pair of engaging clicks 7a, 7b. In this clip 1', since the two engaging clicks 7a, 7b simultaneously engage with roots of threads 4a of the bolt 4, while the bolt 4 is being received within the clip 1', a stronger force is needed to press the clip 1' than a pressing force to press a clip having a single engaging click. Furthermore, if a force is applied to the engaging click 7a which is positioned in the distal part of the engaging portion 6', since the engaging click 7a is far from the base part of the engaging portion 6', there is a fear that the engaging clicks 7a may disengage with the roots of threads and the clip 1' may be pulled off of the bolt 4. Further, stress may easily occur between the engaging clicks 7a and 7b, whereby the engaging click 7a may easily be broken.

SUMMARY OF THE INVENTION

In view of the above, an object of the present invention is to solve the aforementioned problems in the prior art through the introduction of a bolt engaging structure wherein, when a force to pull a member employing the bolt engaging structure is applied to the member, the member can engage with the bolt stably without breaking any portion of the member.

Another object of this invention is to provide a bolt engaging structure wherein only a small force is needed while the member is receiving the bolt.

The aforesaid object of the present invention is accomplished through a bolt engaging structure comprising: a boss section having a cylindrical wall defining a hole for receiving the bolt therein; and an engaging portion for engaging with the bolt accommodated within the hole; the engaging portion slanting inward and extending from the cylindrical wall substantially toward a first direction in which the boss section is pulled off of the bolt, and the engaging portion having an abutting portion to prevent the engaging portion from being bent in a second direction which is opposite to the first direction while the boss section is forced to be pulled off of the bolt.

In a preferred embodiment, the engaging portion has a protrusion with which a root of thread of the bolt engages and the abutting portion has an abutting wall which abuts against screw threads of the bolt.

Further, it is preferred that the abutting wall is positioned in a distal part of the engaging portion in the first direction and the protrusion is positioned close to the base part of the engaging portion.

In a further preferred embodiment, the protrusion substantially formed of a flat face and a sloping face, the flat face adjacent to the abutting wall extending at right angles to an axis of the bolt and being allowed to abut against the screw threads of the bolt, and the slope slanting from the cylindrical wall toward the axis of the bolt.

In the above-described bolt engaging structure according to the present invention, when a pulling force in the first direction is applied to the bolt engaging structure which is receiving a bolt therein, a resistant force which prevents the engaging portion from being bent in the second direction occurs since the abutting portion, preferably the abutting wall, and the protrusion abut against screw threads of the bolt.

Further, in the above structure, since the abutting portion or wall does not engage with any roots of threads of the bolt but only abuts against the screw threads, no force directed to bend the engaging portions occurs in the abutting portion or wall. Also, no stress occurs between the abutting portion or wall and the protrusion, thus the protrusion is prevented from being broken.

Moreover, since the protrusion is positioned close to the base part of the engaging portion, the engaging portion itself can be rigid.

Therefore, there is no fear that the distal part of the engaging portion may be broken and the engaging portion may be bent in the second direction. Thus, the bolt can engage stably with the engaging portion.

DETAILED DESCRIPTION OF THE PREFERRED EMBODIMENTS

An embodiment according to the present invention will be described hereinafter using FIGS. 6-9.

Figure 9A:
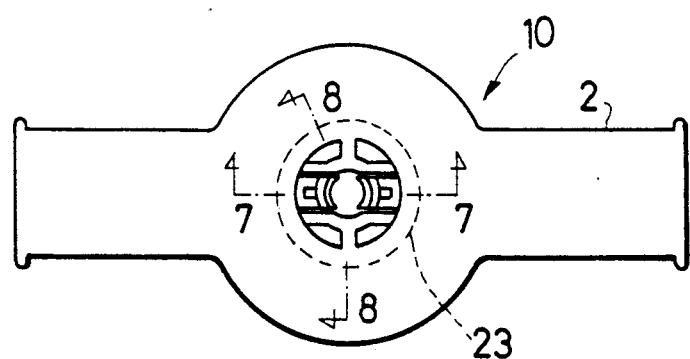
FIGS. 9A and 9B are respectively a plan view and a side elevational view of the clip illustrated in FIGS. 7 and 8.
Figure 9B:
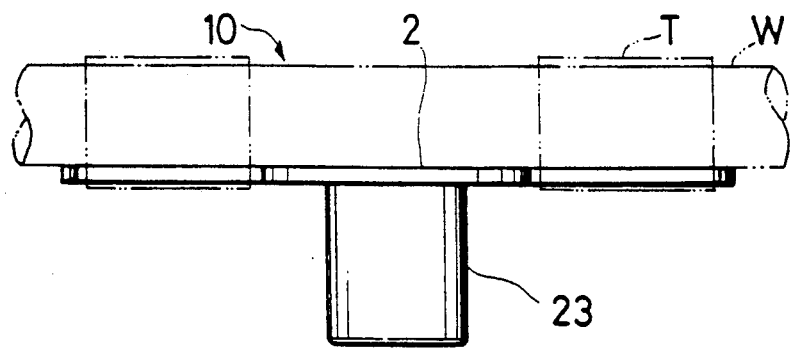

FIGS. 9A and 9B are respectively a plan view and a side elevational view of the clip 10 in which a bolt engaging structure according to the present invention is employed. This clip 10 is used for fixing wire harnesses as shown in FIGS. 9A and 9B. Namely, a boss section 23 extends from a middle portion of a sheet of plate 2 with which a wire harness W is securely bound by a roll of tape T.

Figure 7:
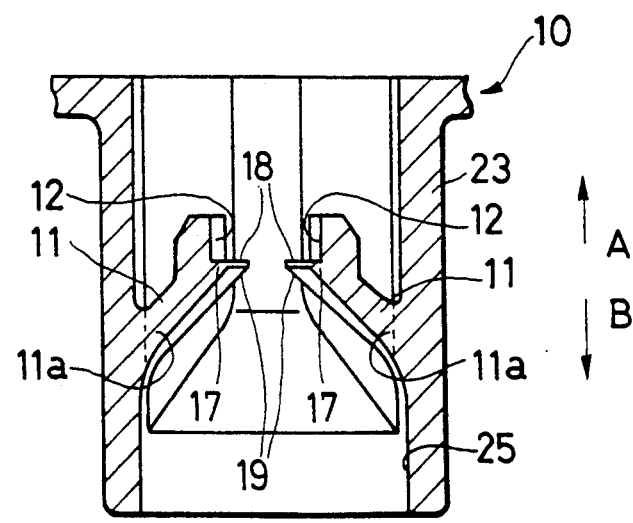
FIG. 7 is a cross sectional view of the clip taken in a direction shown by arrows 6 of FIG. 9.
Figure 8:
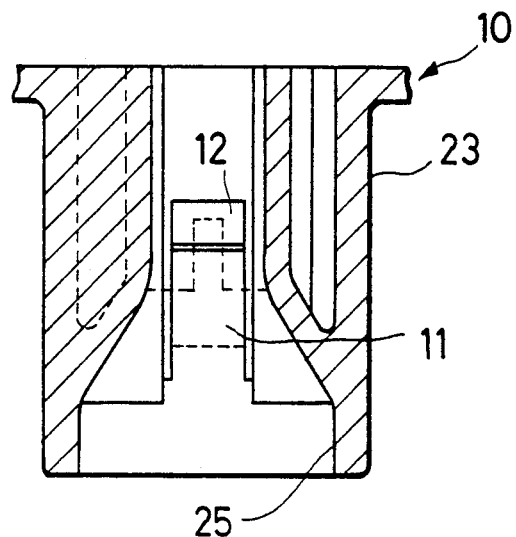
FIG. 8 is a cross sectional view of the clip taken in a direction shown by arrows 8 of FIG. 9.

Referring now to FIGS. 7 and 8, this boss section 23 has a cylindrical wall which defines a hole 25 for receiving a stud bolt 4 therein. In the hole 25, provided are a pair of flexible engaging portions 11 which are positioned opposite each other. These engaging portions 11, while slanting from the cylindrical wall of the boss section 23 toward the axis of the bolt 4, substantially extends in a first direction A in which the boss section 23 may be pulled off of the bolt 4. Further, each of these engaging portions 11 has an abutting wall 12 which is positioned in a distal part of the engaging portion 11. This abutting wall 12 can abut against screw threads 4b of the bolt 4 while the bolt is accommodated within the clip 10. Furthermore, each of these engaging portions 11 includes an engaging click 17 which is positioned close to a base part 11a of the engaging portion 11. Namely, this engaging click 17 is positioned between the abutting wall 12 and the base part 11a of the engaging portion 11. This engaging click 17 can engage with the roots of threads 4a of the bolt 4 while the bolt is accommodated within the clip 10.

To describe in a more detail, the distal part of the engaging portion 11 is formed thicker than the base part 11a of the engaging portion 11. Further, each of the engaging clicks 17 substantially formed of a flat face 18 and a sloping face 19. The flat face of the engaging click 17 extends substantially at right angles to the axis of the bolt 4 and can abut against the screw threads of the bolt. The sloping face 19 slantingly extends from an edge of flat face toward the cylindrical wall of the boss section 23. In other words, the slope 19 extends from the cylindrical wall toward the axis of the bolt 4.

Figure 1A:
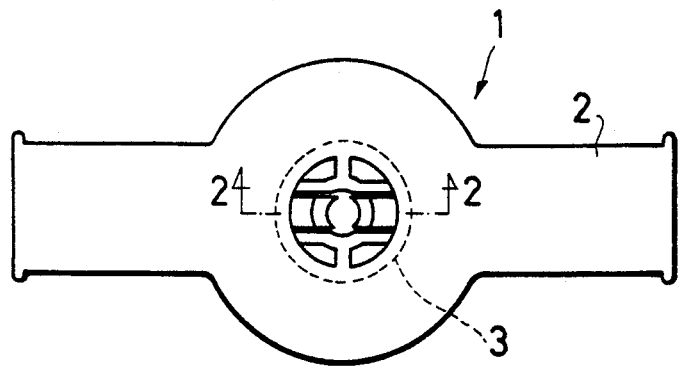
FIGS. 1A and 1B are respectively a plan view and a side elevational view of a clip which employs a conventional bolt engaging structure.
Figure 1B:
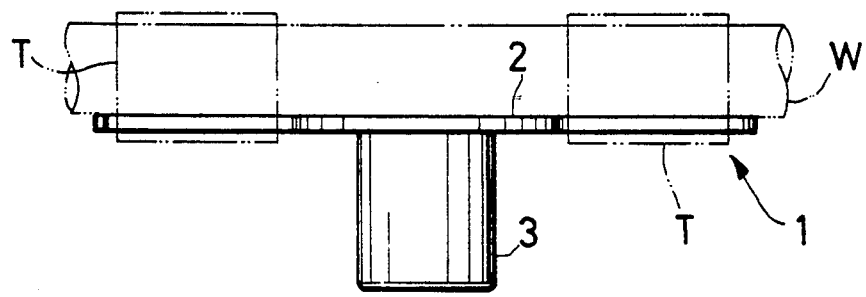
Figure 2:
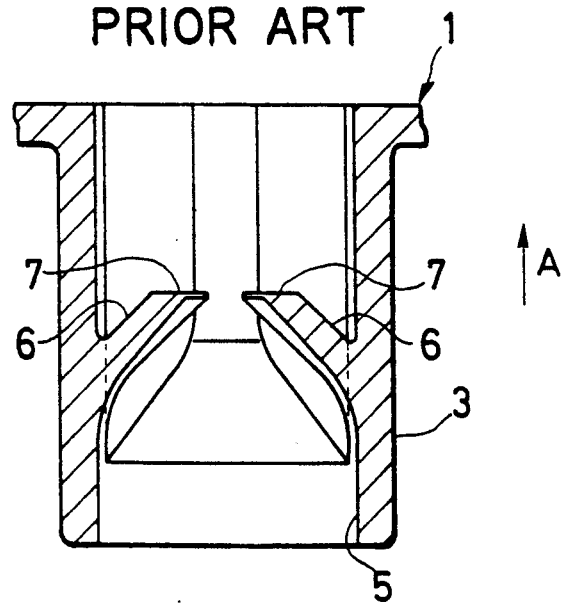
FIG. 2 is a cross sectional view of the clip taken in a direction shown by arrows 2 of FIG. 1.
Figure 3:
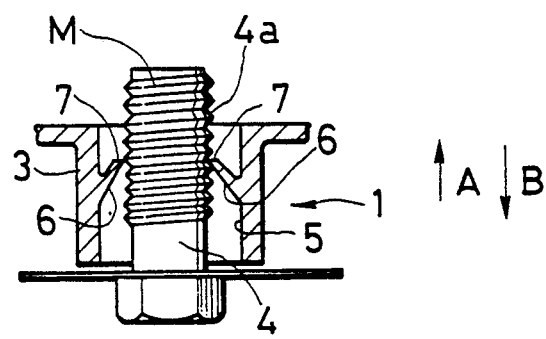
FIG. 3 is a cross sectional view of the clip and a bolt which is received in the clip illustrated in FIG. 2.
Figure 4:
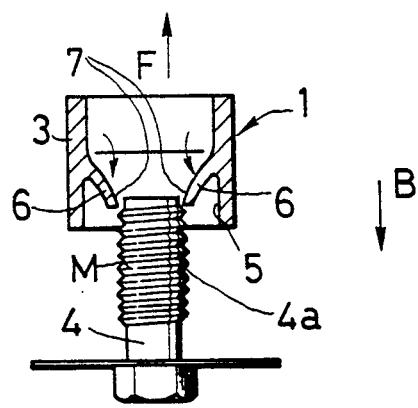
FIG. 4 is a cross sectional view showing a state in which the clip illustrated in FIG. 3 is pulled off of the bolt in explaining a problem of the prior art.
Figure 5A:
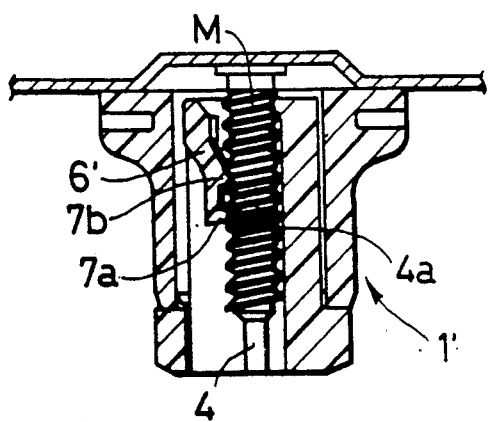
FIGS. 5A and 5B are cross sectional views of another type of clip according to a conventional example.
Figure 5B:
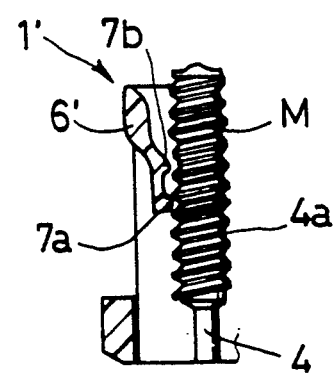
Figure 6:
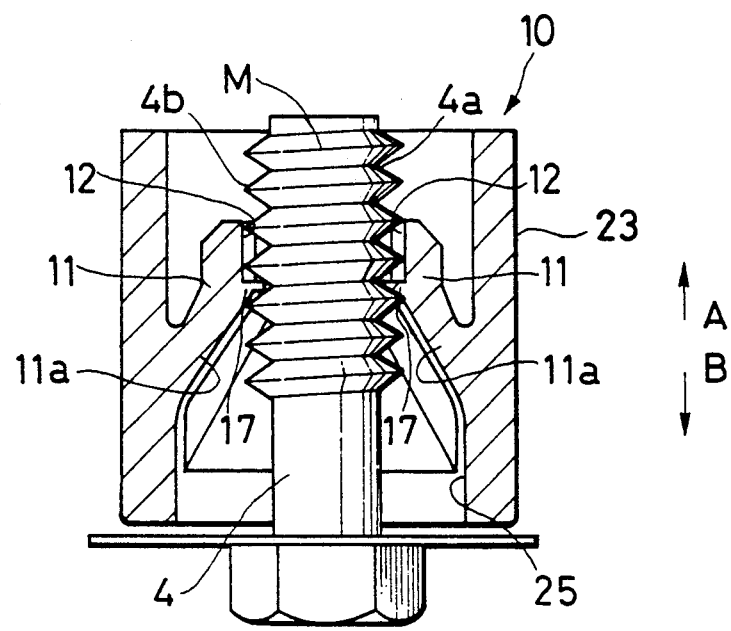
FIG. 6 is a cross sectional view of a clip and a bolt which is accommodated within the clip according to the present invention.

In order to engage the clip 10 with the threads portion M of the bolt 4, the hole 25 of the boss section 23 of the clip 10 is abutted against the thread portion M of the bolt 4 and then the boss section 23 is pressed relative to the bolt 4 as shown in FIG. 6. While the engaging portions 11 are pressed by the thread portion M of the bolt 4, the engaging portion 11 flexes substantially toward the cylindrical wall of the boss section 23 to allow the bolt 4 to be received inside the boss section 23. After this step, the engaging clicks 17 of the engaging portion 11 become engaged with a root of threads of the bolt 4 to prevent the bolt 4 from slipping out of the boss section 23.

While the clip 10 is accommodating a bolt therein as mentioned above, if a pulling force in the first direction A is applied to the clip 10, namely to the engaging clicks 17, an angular moment becomes generated in the engaging portions 11. Further, since the base part 11a of the engaging portion 11 is formed thinner than the distal part thereof, the engaging portions 11 tend to be bent in a second direction B. However, since the abutting walls 12 which are positioned in the distal parts of the engaging portion 11 and also the flat faces 18 abut against the screw threads 4b, a resistant force for preventing the engaging portions 11 from being bent occurs. In other wards, an angular moment in a direction which is opposite to the angular moment mentioned above occurs. Consequently, the engaging portions 11 cannot be bent in this condition. Thus, the clip 10 may not be pulled off of the bolt 4 and the engaging portions 11 may be maintained in a stable engaging condition with the bolt 4.

In more detailed description for the above condition, since the abutting walls 12 do not engage with any roots of threads 4a of the bolt 4 but only abut against the screw threads 4b, no force directed to bend the engaging portions 11 occurs in the abutting wall 12. Also, no stress occurs between the abutting wall 12 and the engaging click 17, thus the engaging click 17 is prevented from being broken.

Further, since the engaging click 17 is positioned close to the base part 11a of the engaging portion 11, the engaging portion 11 itself can be very rigid for being buckled.

Moreover, since the single engaging click 17 of the engaging portion 11 which is positioned in one side within the hole 25 passes over the screw threads 4b while the click 10 is pressed toward the bolt 4, a smaller force is necessary to press the clip 10 toward the bolt 4 than when the engaging portion 11 has more than two clicks 17.

In connection with the above, although a clip 10 for fixing wire harnesses is referred as an embodiment which employs the bolt engaging structure according to the present invention, the present invention may be employed in a harness protector, a pipe supporting device, and the like.

What is claimed is:

1. An engaging structure for engaging a bolt comprising:
   a boss section with a cylindrical wall defining a hole to accommodate the bolt thereinside in the axial direction, said hole being provided with an open end to allow the bolt to come into the hole;
   a supporting portion provided inside the hole of the boss section so as to support the bolt inside the hole and having an engaging projection and an abutting portion, said engaging projection projecting inwardly so as to engage with the screw thread of the bolt accommodated inside the hole, and said abutting for portion abutting against an edge of the screw threads of the bolt accommodated inside the hole; and
   a flexible connecting portion extending from said cylindrical wall of the boss section while slanting inwardly away from said open end and connecting the supporting portion with the cylindrical wall so as to allow the supporting portion to be flexible inwardly and outwardly.

2. An engaging structure according to claim 1, wherein said abutting portion is provided with an abutting wall located at the distal end of said supporting portion so as to press the screw threads of the bolt when a force to pull off the boss section from the bolt acts on the boss section, and said engaging projection is located adjacent to said abutting wall.

3. An engaging structure according to claim 2, wherein said supporting portion has a thickness greater than a thickness of said connecting portion.

4. An engaging structure according to claim 3, wherein said engaging projection has a rear face raised upright from said abutting wall and a front face inclined at an angle from the distal end thereof toward the connecting portion.

5. An engaging structure according to claim 1, comprising a pair of the supporting portions with connecting portions which are provided and positioned opposite each other inside said hole.

6. An engaging structure for engaging a bolt having a screw thread root and a screw thread edge comprising:
   a boss section with a cylindrical wall defining a hole to accommodate the bolt thereinside in the axial direction, said hole being provided with an open end to allow the bolt to come into the hole;
   a supporting portion provided inside the hole of the boss section so as to support the bolt inside the hole and having an engaging projection and an abutting portion having a planar face, said engaging projection projecting inwardly so as to engage with the screw thread root of the bolt accommodated inside the hole, and said planar face of the abutting portion for abutting against the screw thread edge of the bolt accommodated inside the hole; and
   a flexible connecting portion extending from said cylindrical wall of the boss section while slanting inwardly away from said open end and connecting the supporting portion with the cylindrical wall so as to allow the supporting portion to be flexible inwardly and outwardly.

* * * * *

UNITED STATES PATENT AND TRADEMARK OFFICE
CERTIFICATE OF CORRECTION

PATENT NO. : 5,302,070
DATED : April 12, 1994
INVENTOR(S) : Yasushi KAMEYAMA et al It is certified that error appears in the above-indentified patent and that said Letters Patent is hereby corrected as shown below:

Claim 1, column 5, line 17 "for portion" should be --portion for--.

Signed and Sealed this

Fourth Day of October, 1994

Attest:

BRUCE LEHMAN

*Attesting Officer*              *Commissioner of Patents and Trademarks*